3,344,089
ADHESIVES FROM FATTY GUANAMINES AND DIGLYCIDYL ETHERS OF POLYALKYLENE GLYCOLS AND PROCESS OF MAKING SAME

Heinz B. Arnold, Minneapolis, Minn., assignor to General Mills, Inc., a corporation of Delaware
No Drawing. Continuation of abandoned application Ser. No. 169,133, Jan. 26, 1962. This application Apr. 2, 1965, Ser. No. 445,226
20 Claims. (Cl. 260—2)

ABSTRACT OF THE DISCLOSURE

Diglycidyl ethers of polyalkylene glycols are mixed with fatty guanamines and then fully cured or the fatty guanamines and diglycidyl ethers are partially cured to yield stable, homogeneous products which can then be fully cured. A portion of the diglycidyl ethers can be replaced by polyglycidyl ethers of polyhydric phenols.

Such compositions are particularly suitable as adhesives in addition to having utility in other fields such as coatings, sealants, laminates and the like.

---

This application is a continuation of my prior application Ser. No. 169,133, filed Jan. 26, 1962, and now abandoned.

The present invention relates to novel compositions of matter comprising certain epoxy resins and fatty guanamines. More particularly, it relates to tough, flexible compositions comprising the reaction product of fatty guanamines and diglycidyl ethers of polyalkylene glycols. In addition, the basic composition can be modified by replacing a part of the diglycidyl ethers of polyalkylene glycols with epoxy resins prepared from polyfunctional halohydrins and polyhydric phenols. Such compositions are particularly suitable as adhesives in addition to having utility in other fields such as coatings, sealants, laminates and the like.

It is a constant goal of manufacturers of metallic containers to find an organic cement which may be used to replace the usual metallic solder in can seams, particularly in such cans which must be heat processed. Such a cement must possess good adhesion to a variety of substrates and have high peel strength. In addition, the cement should be capable of attaining these qualities within a very short elevated temperature cure cycle. For ease of application, the cement should be a one-package system with a sufficiently long shelf life at ambient temperatures.

Since most epoxy curing systems are reactive at room temperature at least to some degree and react to produce cured resins when maintained at room temperature for extended periods of time, it is necessary to keep the epoxy resin and the curing agents in separate containers until it is desired to effect reaction. However, partially cured or "B stage" resins may be produced from the fatty guanamines and diglycidyl ethers of polyalkylene glycols of the present invention. These partially cured compositions possess certain distinct advantages—they afford a one-package curable composition which can be a stable commodity of commerce. Furthermore, they cure in a reasonable time at high temperatures to produce tough, flexible thermosets which have excellent adhesion to a wide variety of substrates and exhibit good peel strength.

"B stage" resins have been successfully prepared from fatty guanamines and epoxies other than those instantly used. However, the fully cured resins prepared therefrom lack the peel strength of the resin blends of this invention. For example, guanamines when reacted with epoxies such as those prepared from Bisphenol A and epichlorohydrin, the glycidyl ethers of tetra(p-hydroxyphenyl)-ethane, the epoxy Novolacs, and the epoxy composition prepared from epichlorohydrin and bis-(p-hydroxyphenyl) sulfone yield hard, rigid plastics with little or no peel strength.

It has now been discovered that compositions comprising certain epoxy resins and fatty guanamines can be cured to produce tough, flexible thermosets which have excellent adhesion to a wide variety of substrates and exhibit good peel strength. It has further been discovered that the above compositions can be partially cured to provide "B stage" resins which are stable for extended periods of time and yet will react in a reasonable period of time at elevated temperatures to provide infusible, insoluble fully cured products having excellent adhesive and peel strength characteristics.

It is, therefore, an object of this invention to provide a tough, flexible, adhesive composition.

It is also an object of this invention to provide such a composition of certain epoxy resins and fatty guanamines.

It is a further object of this invention to provide a partially cured epoxy resin formulation which is stable for extended periods but which is capable of rapid reaction at elevated temperatures.

It is also an object of this invention to provide a partially cured epoxy resin formulation having good stability.

It is still further an object of this invention to provide a cement for the seams of metallic containers. Another object of the invention is to provide metallic containers having the seams thereof sealed with a tough, flexible adhesive composition of certain epoxy resins and guanamines.

In making metallic containers such as cans the operation is highly mechanized and automatic devices are used which serve to form and shape the parts and to bring the parts together for formation of seams. These devices are mechanically timed and operate at high rates of speed. Successive parts to be joined follow one another at very short intervals. Moreover automatic can-making machines are equipped with thermostatically controlled heaters which heat the adhesive to a specific and limited temperature range at which the adhesive is soft or liquid. It is essential in such operation that the bonding agent at this temperature be sufficiently soft and have suitable viscosity characteristics such that it will flow onto the seam portion of the can and such that it will develop adhesive characteristics within a certain limited period of time. It is important that the bonded seams will not fail when the can is subjected to ordinary handling in manufacture, packing and shipping. In addition, the products in the cans should not be affected in any way by the metallic container or the adhesive used. In the case of cans for solvents and oils the adhesive must not be soluble in these materials but should retain its adhesive properties under such circumstances.

The containers sealed with the compositions of the present invention may be made of any metal conveniently used in making containers. Illustrative of the metals which are used are steel, aluminum, copper, bronze, tin plate and the like. As the containers are generally formed of sheet metal, the seams are usually formed of interfolded metal layers. An adhesive is used in the seams to serve to strengthen the mechanical joints formed during can manufacture, thereby yielding a stronger and more rigid container. The adhesive also serves as a sealant to fully contain the ingredients of the container which is impossible to accomplish by mechanical means alone.

The compositions of the present invention are well suited for applications either as adhesives for interfolded side seams of sheet metal containers or as gasket material for the end seams of sheet metal containers. They may also be used as adhesives for lap seams in containers.

Container seams and the method of applying adhesives thereto are illustrated in my prior U.S. Patent 2,994,455. The products are heat stable, tough, resilient and do not tend to be brittle. Thus, seams bonded with the products remain intact during the usual conditions of handling both in fabrication of the can as well as in packing of the can and in shipment through the ordinary channels of distribution. Also they possess the requisite adhesive and cohesive strength for the above described applications and are relatively inert to alkaline and acidic substances, lubricating oils, and numerous other materials.

As pointed out above, the products of the present invention are comprised of the diglycidyl ethers of polyalkylene glycols which are reacted or partially reacted with certain fatty guanamines. In some instances, it is desirable to replace a portion of the diglycidyl ethers of polyalkylene glycols with an epoxy resin of a polyfunctional halohydrin and a polyhydric phenol.

The diglycidyl ethers of polyalkylene glycols are readily available commercially and may be represented by the following theoretical, idealized formula:

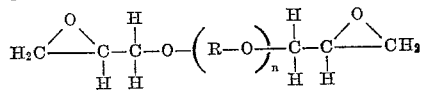

where R is an alkylene radical having from 2–5 carbon atoms and $n$ is an integer of from about 1 to about 50. R is preferably ethylene or propylene or mixtures thereof and $n$ is preferably about 3 to 10. It is understood that $n$ represents an average figure since the ethers are often prepared from a mixture of glycols—i.e., tripropylene glycol, tetrapropylene glycol and the like.

It is further understood that these epoxy compounds, the diglycidyl ethers of polyalkylene glycols, may contain chloromethyl substituents. These chloromethyl groups would be formed during the polymerization of epichlorohydrin. Also, chloromethyl substituents would be formed if the hydroxy groups resulting from the reaction of epichlorohydrin with the polyalkylene glycol were to react with another molecule of epichlorohydrin.

In general, the diglycidyl ethers are obtained from the well known polyalkylene glycols. Illustrative of the glycols are tetrapropylene glycol and the like corresponding to the general formula.

$$HO-(R-O-)_nH$$

where R and $n$ have the same values as set forth above with respect to the diglycidyl ether formula. The polyalkylene glycols are reacted with epichlorohydrin to prepare the diglycidyl ethers. A suitable method of preparation is set forth in U.S. Patent No. 2,923,696.

As indicated above, a portion of the diglycidyl ethers of polyalkylene glycols may be replaced by an epoxy resin prepared from polyfunctional halohydrins and polyhydric phenols. These resins are well known and commercially available. Typical phenols useful in the preparation thereof include resorcinol and various bisphenols resulting from the condensation of phenol with aldehydes and ketones such as formaldehyde, acetaldehyde, acetone, methyl ethyl ketone and the like. A typical epoxy resin is the reaction product of epichlorohydrin and 2,2-bis(p-hydroxyphenyl) propane (hereinafter referred to as Bisphenol A), the resin having the following theoretical structural formula,

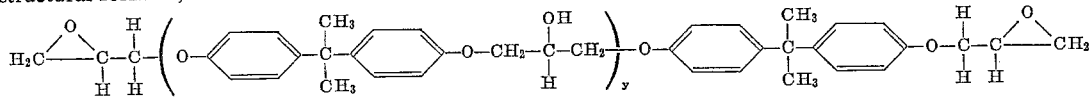

where $y$ is 0 or an integer up to 10. Generally speaking, $y$ will be no greater than 3 or 4 and is preferably 3 or less. These resins may be further characterized by reference to their epoxy equivalent weight which should be in the range of 140 to 2000 and preferably from 140 to 600. The epoxy equivalent weight of pure epoxy resins is the mean molecular weight of the resins divided by the mean number of epoxy radicals per molecule, or in any case the number of grams of epoxy resin equivalent to one epoxy group or one gram equivalent of epoxy.

A wide variety of fatty guanamines may be employed in the present invention. They may be represented by the following formulae:

(A) 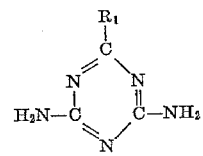

(B) 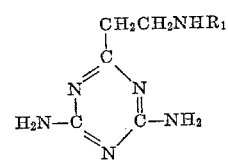

(C) 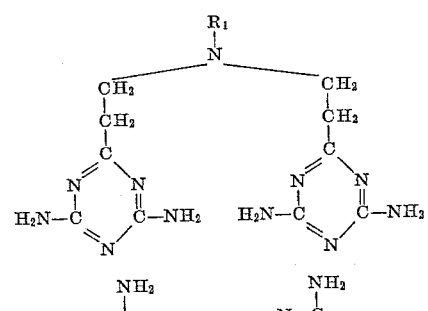

(D) 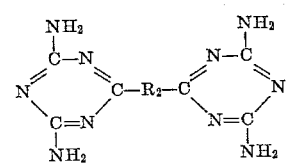

where $R_1$ is an aliphatic hydrocarbon group containing from 4 to about 21, and preferably 6 to 21, carbon atoms and $R_2$ is the hydrocarbon group of dimerized unsaturated fatty acids.

The foregoing guanamine compounds may be defined generally by the following formula: $(A)_xB$ where A is the ring,

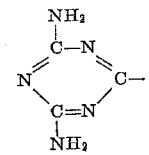

$x$ is a whole integer of 1 to 2 and B, when $x$ is 1, is selected from the group consisting of $R_1$ and $$R_1NHCH_2CH_2-$$

and, when $x$ is 2, is selected from the group consisting of $R_1N(CH_2CH_2-)_2$ and $R_2$ where $R_1$ and $R_2$ have the meanings set forth above.

These guanamines are conveniently made from dicyandiamide and nitriles. Thus the alkyl substituted guanamines may be prepared from alkyl nitriles such as those derived from fatty acids. Compound B may be made from the nitrile $R_1NHCH_2CH_2CN$, which is the acrylonitrile adduct with the fatty amine $R_1NH_2$. Compound C may be made from the acrylonitrile diadduct of the fatty amine $R_1NH_2$, $R_1N(CH_2CH_2CN)_2$. Compound D may be made from the dinitrile prepared from dimerized fatty acids such as linoleic acid. Thus, the fatty guanamines may be prepared from fatty acids containing from 5 to 22 carbon atoms and the polymerized derivatives thereof by converting the fatty acids to the nitriles and then reacting the nitriles with dicyandiamide. The fatty acid employed may be a single, isolated fatty acid or may be the mixed fatty acids from a fat or oil or any selected fraction of such fatty acids. Moreover, the fatty acids may be either saturated or unsaturated. In addition, it is understood that the term "fatty" as used herein is not intended to exclude the branch chain products having the same number of carbon atoms. In the examples to follow, the fatty guanamines derived from the $C_8$ to $C_{18}$ acids of coconut oil are referred to as cocoguanamines.

Various methods of preparing the above described fatty guanamines are known in the art. Thus see the following U.S. Patents: 2,447,175; 2,459,397; 2,606,904; 2,684,366; 2,777,848; 2,792,395; and 2,900,367.

The guanamine is used in an amount sufficient to cure the epoxy resins. Generally, said guanamines are used in ratios by weight to epoxy resin of from about 5:95 to 75:25 and preferably from about 10:90 to 25:75. It is particularly preferred to use a ratio of 15:85.

The diglycidyl ethers of polyalkylene glycols may be used as the sole epoxy resin in the preparation of the tough, flexible thermosets of the present invention. However, if impact resistance is no object, a portion of said ethers may be replaced by the conventional polyfunctional halohydrinpolyhydric phenol type epoxies. In such cases, the ratios by weight of the polyalkylene glycol diglycidyl ether epoxies to the polyhydric phenol halohydrin type epoxies may be from about 20:80 to about 80:20. However, it is preferred to use weight ratios of 25:75 to 75:25. Ratios of 30:70 to 50:50 are particularly preferred.

By "B stage" resin is meant a partially cured product which will undergo little or no physical change during extended storage at ambient room temperatures and in which the reactants are homogeneously compatible in a one component, stable compound ready for final cure at elevated temperatures.

A "B stage" resin can generally be described as a partially cured composition which is stable for extended periods of time but is capable of being quickly cured at elevated temperatures. The epoxy-guanamine compositions may be described as proceeding through three stages, A, B and C.

The "A stage" would be a simple blend or mixture of the epoxy resin and guanamine in which essentially no reaction has taken place. Such a simple blend or mixture will be stable for great lengths of time, but may or may not be homogeneous.

The "B stage" is the same resin composition which has been partially reacted or cured and is quite stable at ambient room temperatures for extended periods of time. The "B stage" resin can be further reacted at elevated temperatures to yield the fully cured stage, the "C stage," which is an infusible and insoluble polymer.

The "A stage" mixture may, of course, be cured at elevated temperatures to provide an infusible, insoluble polymer. However, longer cure times are required. The use of a "B stage" resin permits rapid cure when required and still provides a stable starting material.

The present invention covers all three stages of the epoxy-guanamine compositions. The "A stage" composition is prepared by blending the fatty guanamines and epoxy resins. The "B stage" resins are prepared by heating a mixture of the constituents to effect partial cure and stopping such curing before the "C stage" is reached. This partial cure can be effected at various temperatures. At high temperatures, the heating time for producing the "B stage" resin is short and care must be taken that the reaction time is not sufficiently extended so as to result in the "C stage." At low temperatures, the heating period is longer and more control can be exercised. As a practical matter, the epoxy-guanamine system employed in this invention will generally be "B staged" at temperatures in the range of 125 to 170° C. Temperatures outside this range may be used, however, although such may present some problems. For example, at temperatures above 180° C. the time of heating is so short that it is difficult to prevent advancement of the cure to the "C stage" or finally cured state. At temperatures below 100° C. the time of heating is so prolonged as to be impractical or uneconomical. A common temperature used in practice is about 150° C., at which temperature the heating period is sufficiently long to allow for control over the reaction and yet is not an impractical or uneconomical length of time.

As the temperature and period of heating will vary somewhat depending on the particular epoxy resin, the particular guanamine and the proportions used thereof, some means of indicating when the desired "B stage" resin is obtained had to be devised. It is, of course, most important that the reaction not be carried out to the point where gelation occurs. One means of avoiding gelation, which can be used during the heating period, is determination of the viscosity of the product. Another is to determine the oxirane oxygen content periodically and observe the rate of change thereof.

In observing the change in viscosity during heating, it is noted that very little change occurs during the initial heating period. As heating is continued, the rate of change in viscosity begins to increase somewhat and just prior to gelation the viscosity increases very rapidly. When the viscosity begins to increase greatly, heating is discontinued and the product must be cooled quickly before gelation occurs.

In determining oxirane oxygen content, resin samples are withdrawn from the batch periodically, cooled rapidly, and dissolved in acetic acid. The solution is titrated with HBr to the end point (crystal violet). Since HBr titrates both the oxirane oxygen of the epoxy resin and the amine of the guanamine, mercuric acetate solution is then added and the solution is titrated to the same end point as before. The difference between the two titrations represents the actual oxirane oxygen content of the sample.

Use of both viscosity measurement and oxirane oxygen analysis in determining the extent of "B-staging" is illustrated in Example XVIII.

Thus "B stage" resins of the present invention may be prepared by heating the mixture of components at a temperature sufficient to effect partial cure, for example at about 100 to 210° C., and preferably at 140 to 170° C. Thereafter heating should be discontinued and the reaction mixture should be cooled before final cure occurs so that a "B-staged" resin with the desired properties results. The desired point of termination may be determined by observing the viscosity and oxirane oxygen content. In general, a "B stage" resin will exist when the reaction is from about 5 to 90% complete based on the disappearance of oxirane oxygen. As a practical matter tthe preferred "B stage" resins are those in which the reaction is about 15 to 50% complete, the most desirable being about 25 to 40% complete.

The epoxy-fatty guanamine compositions have a threshold curing temperature of near 120° C. but for rapid cure, temperatures in excess of 150° C. are preferred. At temperatures below 120° C., the compositions are quite stable for extended periods of time. For example, a "B-staged" epoxy-fatty guanamine mixture was held at 25° C. for 48 days, at the end of which time the resin was still mobile and usable.

This property of long shelf life makes possible several useful areas of application for these compositions. There has been a continuing search for "B-staged" epoxy compositions which have a long shelf life and which can be used to formulate molding compounds, sealants, adhesives, potting compounds, and fiber glass laminates. Fibrous materials which are impregnated with the compositions of the present invention and laminates derived from such impregnated fibrous materials are disclosed and claimed in the copending application of Dwight E. Peerman, Ser. No. 194,149, filed May 11, 1962. With the present invention it is possible to prepare compositions containing the resins of the invention and have them remain uncured for long periods of time even at temperatures considerably higher than room temperature. At the same time these compositions may be cured at temperatures around 150° C. to yield tough, flexible thermosets which have excellent adhesion to a wide variety of substrates and exhibit good peel strength. The resins of this invention are particularly useful as cements for the sealing of metallic containers.

The following reactants were used in the preparation of the adhesive formulations in the examples which follow, said examples serving to further illustrate the invention:

*Epoxy Resin A.*—A diglycidyl ether of a polyalkylene glycol of the general formula set forth hereinabove wherein R is propylene and $n$ is about 7. Said resin has an epoxy equivalent weight of about 330 and a viscosity of 88 centipoises at 25° C.

*Epoxy Resin B.*—A diglycidyl ether of a polyalkylene glycol of the general formula set forth hereinabove where R is propylene and $n$ is about 4. Said resin has an epoxy equivalent weight of about 195 and a viscosity of 52 centipoises at 25° C.

*Epoxy Resin X.*—A condensation product of Bisphenol A and epichlorohydrin having an epoxy equivalent weight of about 190.

*Epoxy Resin Y.*—A condensation product of Bisphenol A and epichlorohydrin having an epoxy equivalent weight of about 525.

*Cocoguanamine.*—An alkyl guanamine prepared from dicyandiamide and the nitrile derived from coconut oil fatty acids.

EXAMPLES I–XIV

The adhesive formulations of Examples I–XIV were prepared by blending the epoxy resins and cocoguanamine at room temperature, heating to 160° C. to effect partial cure and cooling the resulting "B stage" resins to room temperature. The partially cured resins were viscous, but mobile, and were tested for peel strength. The particular reactants, ratios and peel strengths for the examples are set forth in Table I. The peel strength was determined by bonding 1 inch wide can makers quality (CMQ) black plate strips with the adhesives. The adhesives were cured for 5 hours at 300° F. in a forced draft oven, adhesive thickness between the strips being limited to about 3 to 5 mils. The peel strength was measured by using a Dillon Multirange Tester. The uncemented ends of the black plate strips were drawn at a rate of one inch per minute saddlewise over a plurality of ½ inch diameter roll guides suspended in a jig which is attached to one end of the tester. The maximum reading in pounds was recorded as the peel strength. Five specimens of each formulation were tested and the average value is that set forth in Table I.

TABLE I

| Example | Epoxy Resins | Ratio, Parts by Wt. | Ratio Parts by Wt. Total Epoxy Resin to Cocoguanamine | Average Peel Strength, Pounds |
|---|---|---|---|---|
| I | A:X | 60:40 | 85/15 | 59 |
| II | A:X | 30:70 | 85/15 | 100 |
| III | B:X | 60:40 | 85/15 | 32 |
| IV | B:X | 50:50 | 85/15 | 85.5 |
| V | B:X | 40:60 | 85/15 | 122 |
| VI | B:X | 30:70 | 85/15 | 56 |
| VII | A:X:Y | 40:40:20 | 85/15 | 119 |
| VIII | A:X:Y | 33:50:17 | 85/15 | 108 |
| IX | A:X:Y | 26:60:14 | 85/15 | 115.5 |
| X | A:X:Y | 20:70:10 | 85/15 | 31 |
| XI | B | 100 | 60/40 | 36 |
| XII | A:Y | 66:34 | 80/20 | 56 |
| XIII | A:Y | 66:34 | 70/30 | 50 |
| XIV | A:Y | 66:34 | 60/40 | 61 |

EXAMPLE XV

To 85 parts by weight of a mixture of Epoxy Resin A, Epoxy Resin X and Epoxy Resin Y (ratio by weight of 33, 50 and 17, respectively) were added 15 parts by weight of cocoguanamine. The material was "B staged" at 125° C. for a period of 5 hours during which time the viscosity of the resin at 125° C. increased from 20 to 104 centipoises. At the end of this time the resin was cooled quickly to 70° C. and poured into suitable containers. The viscosity of the resin at 25° C. was 12,000 poises.

The peel strength of this resin was tested in the manner described in Examples I–XIV, the only difference being that the specimens were cured in a heated platen press at 460° F. for 4 minutes. An average of four specimens gave a value of 127 lbs.

Tensile shear specimens, one inch in width, were prepared on cold roll steel with a ¼ inch overlap and an adhesive thickness of about 1 mil. Four such specimens were prepared and cured in a forced draft oven at 300° F. for five hours. The average tensile shear strength was 3,270 p.s.i.

A 400 g. sample of the adhesive of this example was stored at ambient room temperature and at certain intervals viscosity and peel strength were determined. The peel strength specimens were prepared and tested as described above, except that the specimens were cured in a heated platen press at 460° F. for 5 minutes. Results of the shelf life test are set forth in Table II.

TABLE II

| Lapsed Storage Time (Days): | Viscosity at 25° C. (Poises) | Average Peel Strength, Lbs. |
|---|---|---|
| Initial | 12,000 | 123 |
| 13 | >20,000 | 131 |
| 28 | | 119 |
| 35 | | 118 |
| 44 | | 110 |
| 62 | | 119 |

Although the viscosity is not measurable after 13 days with a Brookfield viscometer, the adhesive is still mobile and usable and peel strength remains high even after specimens were prepared from the adhesive which had been stored at room temperature for 62 days.

This example demonstrates that the adhesives of the present invention are excellent cements for seams of metallic containers. By way of comparison, the thermoplastic type cements (solid polyamides) have an average peel strength of only about 25 to 40 pounds (on ¾ inch wide CMQ black plate strips). In fact, the adhesives of this invention are very nearly equal in strength to the flexible two component aminoimidazoline:epoxy cements (see U.S. Patent No. 2,994,455) but have the added advantage of being one-package cements with a long usable shelf life (see Table II above).

EXAMPLE XVI

To 85 parts by weight of the same epoxy resin mixture as used in Example XV were added 15 parts by weight of cocoguanamine. This mixture was "B staged" by heating at 150° C. with stirring for 70 minutes during which time the viscosity was measured at 150° C. increased from 16 to 40 centipoises. At the end of this time the resin was cooled quickly to about 70° C. and poured into a suitable container. The viscosity was 8,500 poises at 25° C.

The peel strength and shelf life of this resin were tested in the manner described in Example XV (the specimens were cured in a platen press at 460° F. for 5 minutes). Results are set forth in Table III.

TABLE III

| | Viscosity at 25° C. (Poises) | Average Peel Strength, Lbs. |
|---|---|---|
| Lapsed Storage Time (Days): | | |
| Initial | 8,500 | 120 |
| 21 | 17,200 | 148 |
| 58 | >20,000 | 126 |

Viscosity is no longer measurable with a Brookfield viscometer after 58 days. However, the adhesive is still mobile and usable and peel strength remains high.

This adhesive was also used to prepare tensile shear specimens, one inch in width, from cold rolled steel strips with a ¼ inch overlap and an adhesive thickness of about 1 mil. The average tensile strength of four specimens cured 5 hours at 300° F. was 3.720 p.s.i.

A 400 gram sample of this adhesive was stored at 130° F. in a forced draft oven and viscosity was checked daily. The viscosity increased from 136 poises to 4,450 poises over a period of 8 days and the resin gelled after 10 days under these storage conditions. Thus this adhesive displays very good stability at elevated temperatures.

EXAMPLE XVII

To 80 parts by weight of the same epoxy resin mixture as used in Example XV were added 20 parts by weight of cocoguanamine. This mixture was heated at 150° C. with stirring for 59 minutes during which time the viscosity as measured at 150° C. increased from 16 to 46 centipoises. At the end of this time the resin was cooled quickly to 70° C. and poured into a suitable container. The viscosity at 25° C. was greater than 20,000 poises. Peel strength specimens were prepared as described in Example XV and these were cured in a heated platen press at 460° F. for 3 minutes. The average peel strength was 110.5 lbs. This same peel strength was obtained with specimens cured at 370° F. for 12 minutes. Shelf life of this cement at ambient room temperature is very good. Peel specimens, prepared from the cement after it had been stored at room temperature for 48 days, had an average peel strength of 134 lbs. Thus, although the viscosity of this cement was very high, the resin remains mobile and usable even after a month and a half storage and peel strength remains high.

EXAMPLE XVIII

To 80 parts by weight of a blend of Epoxy Resin A and Epoxy Resin Y (ratio by weight of 66 and 34, respectively) were added 20 parts by weight of cocoguanamine. This mixture was heated with stirring at 150° C. for a total of 120 minutes. The reaction was followed during its course by means of viscosity and oxirane oxygen measurements as a function of time at 150° C. These measurements are summarized in Table IV.

TABLE IV

| | Viscosity at 150° C. (Centipoises) | Percent Oxirane Oxygen |
|---|---|---|
| Time, Minutes: | | |
| 0 | 14 | 2.8 |
| 40 | 26 | 2.5 |
| 60 | 36 | 2.0 |
| 80 | 56 | 1.46 |
| 100 | 100 | |
| 110 | 124 | |
| 120 | 204 | 1.1 |

As is apparent from the foregoing table, the change in viscosity increases as the reaction proceeds and heating must be terminated prior to gelation to provide a suitable "B stage" resin. In this example the heating was terminated at 120 minutes and the resin was cooled quickly to room temperature. The viscosity of the "B staged" resin was greater than 20,000 poises at 25° C. The time and temperature needed to obtain the desired "B staged" resin from any particular blend of epoxy resin and fatty guanamine can, therefore, be determined by measuring the viscosity increase and decrease in oxirane oxygen content.

Peel strength specimens using the resin of this example were prepared as described in Example XV and these were cured in a heated platen press at 460° F. for 10 minutes. The average peel strength was 57 lbs. The stability of this adhesive is also good. Thus a sample was stored in a forced draft oven at 160° F. and fluidity checked visually. The resin gelled after 72 hours storage in this greatly accelerated test.

All of the adhesive compositions in the above examples were "B staged." However, it is understood that simple blends of the epoxy resins and fatty guanamines can be used since the properties of the finally cured product do not depend on whether a "B stage" resin was first produced or whether the mixture of the epoxy resin and guanamine was heated directly to the cured stage (C stage). It is preferred to use "B stage" resins since said resins still have a long usable shelf life and can be fully cured in a shorter time than the simple mixture (A stage).

The tough, flexible compositions of the present invention are particularly useful as adhesives. However, said compositions are not limited to this use. Coatings, sealants, laminates and the like may also be prepared therefrom. It is also within the scope of the invention to include in said compositions solid modifiers (such as pigments, fillers, and treated clays), solvents and other well known addition agents.

It is to be understood that the invention is not to be limited to the exact details of operation or the exact compositions shown and described, as obvious modifications and equivalents will be apparent to those skilled in the art and the invention is to be limited only by the scope of the appended claims.

I claim:
1. A curable composition of matter consisting essentially of (1) a diglycidyl ether of a polyalkylene glycol having the formula

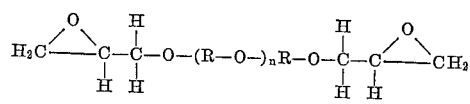

where R is an alkylene radical having from 2–5 carbon atoms and $n$ is an integer of from about 1 to about 50 and (2) a fatty guanamine selected from the group consisting of (A)

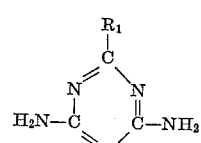

(B)

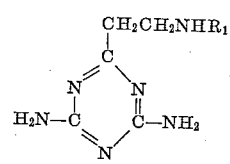

(C) 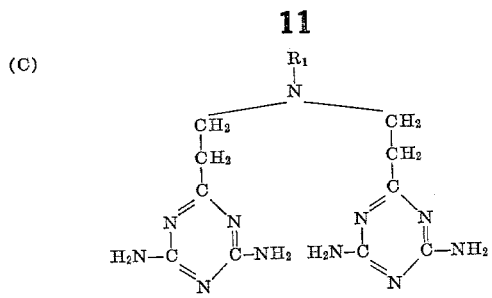

and (D) 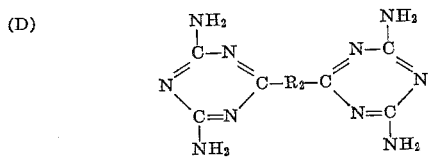

where $R_1$ is an aliphatic hydrocarbon group containing from 4 to 21 carbon atoms and $R_2$ is the hydrocarbon group of dimerized unsaturated fatty acids of from 5 to 22 carbon atoms, the guanamine being present in an amount sufficient to cure the diglycidyl ether to an infusible, insoluble polymer.

2. The composition of claim 1 wherein the guanamine has the formula (A).

3. The composition of claim 2 wherein $R_1$ is an aliphatic hydrocarbon group of 7 to 17 carbon atoms.

4. The composition of claim 1 wherein R is propylene and $n$ is an integer of from about 3 to about 10.

5. The composition of claim 1 wherein a portion of the diglycidyl ether (1) is replaced by (3) a polyglycidyl ether of a polyhydric phenol having an epoxy equivalent weight of 140–2000, the weight ratio of (1) to (3) being in the range of about 80:20 to 20:80.

6. A curable composition stable for extended periods of time at ambient room temperatures consisting essentially of (1) a diglycidyl ether of a polyalkylene glycol having the formula:

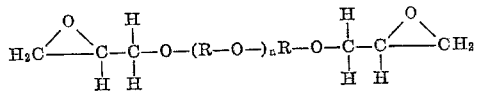

where R is an alkylene radical having from 2–5 carbon atoms and $n$ is an integer of from about 1 to about 50, partially cured to from 5 to 90% with (2) a fatty guanamine selected from the group consisting of (A) 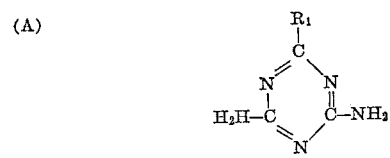

(B) 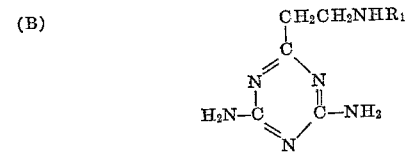

(C) 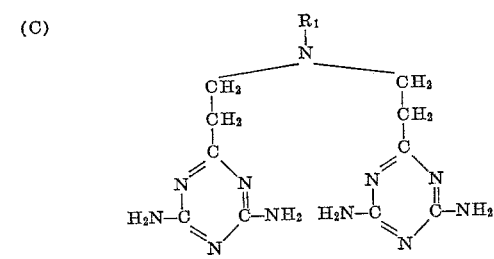

and (D) 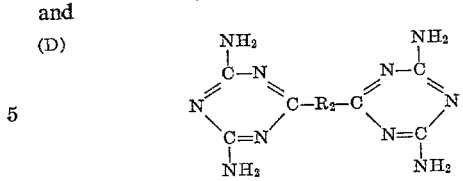

where $R_1$ is an aliphatic hydrocarbon group containing from 4 to 21 carbon atoms and $R_2$ is the hydrocarbon group of dimerized unsaturated fatty acids of from 5 to 22 carbon atoms, the guanamine being present in an amount sufficient to cure the diglycidyl ether to an infusible, insoluble polymer.

7. The composition of claim 6 wherein the guanamine has the formula (A).

8. The composition of claim 7 wherein $R_1$ is an aliphatic hydrocarbon group of 7 to 17 carbon atoms.

9. The composition of claim 6 wherein R is propylene and $n$ is an integer of from about 3 to about 10.

10. The composition of claim 6 in which the extent of cure is from 15 to 50%.

11. The composition of claim 6 wherein a portion of the diglycidyl ether (1) is replaced by (3) a polyglycidyl ether of a polyhydric phenol having an epoxy equivalent weight of 140–2000, the weight ratio of (1) to (3) being in the range of about 80:20 to 20:80.

12. A cured composition of matter consisting essentially of (1) a diglycidyl ether of a polyalkylene glycol having the formula

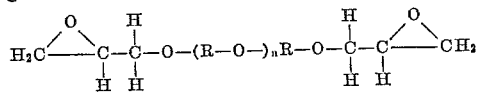

where R is an alkylene radical having from 2–5 carbon atoms and $n$ is an integer of from about 1 to about 50 and (2) a fatty guanamine selected from the group consisting of (A) 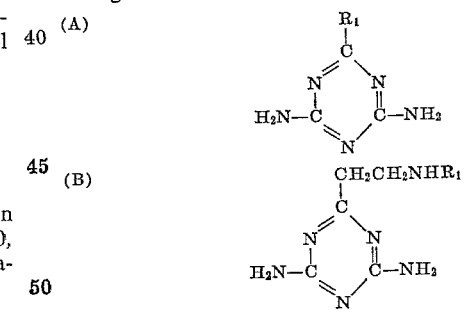

(B)

$$CH_2CH_2NHR_1$$

(C)

(D) 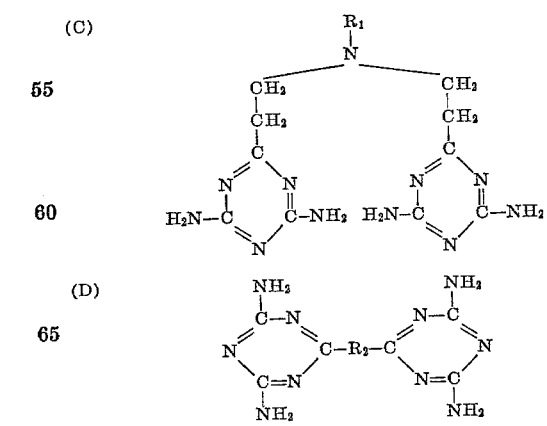

where $R_1$ is an aliphatic hydrocarbon group containing from 4 to 21 carbon atoms and $R_2$ is the hydrocarbon group of dimerized unsaturated fatty acids of from 5 to 22 carbon atoms.

13. The composition of claim 12 wherein the guanamine has the formula (A).

14. The composition of claim 13 wherein $R_1$ is an aliphatic hydrocarbon group of 7 to 17 carbon atoms.

15. The composition of claim 12 wherein R is propylene and $n$ is an integer of from about 3 to about 10.

16. The composition of claim 12 wherein a portion of the diglycidyl ether (1) is replaced by (3) a polyglycidyl ether of a polyhydric phenol having an epoxy equivalent weight of 140–2000, the weight ratio of (1) to (3) being in the range of about 80:20 to 20:80.

17. A process of producing a heat curable composition stable for extended periods of time at ambient room temperatures comprising reacting, at temperatures of about 100 to 210° C., (1) a diglycidyl ether of a polyalkylene glycol having the formula:

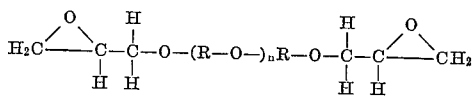

where R is an alkylene radical having from 2–5 carbon atoms and $n$ is an integer of from about 1 to about 50 with (2) a fatty guanamine in an amount sufficient to cure the diglycidyl ether to an infusible, insoluble polymer, said fatty guanamine being selected from the group consisting of (A)

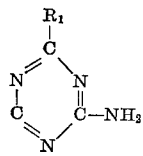

(B)

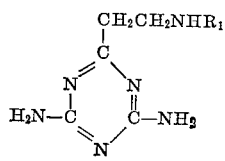

(C)

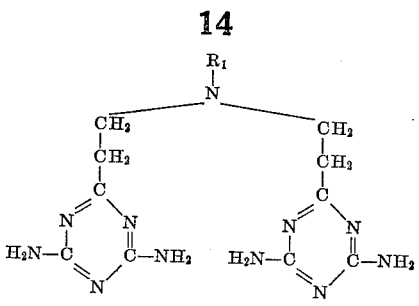

and (D)

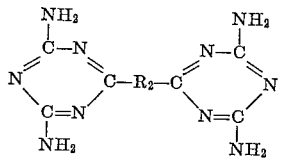

where $R_1$ is an aliphatic hydrocarbon group containing from 4 to 21 carbon atoms and $R_2$ is the hydrocarbon group of dimerized unsaturated fatty acids of from 5 to 22 carbon atoms and terminating said reaction when 5 to 90% complete by cooling the resulting heat curable composition.

18. A process as defined in claim 17 in which said reaction is terminated when 15 to 50% complete.

19. A process as defined in claim 17 in which said fatty guanamine (2) and said ether (1) are employed in a weight ratio of about 5:95 to 75:25.

20. A process as defined in claim 17 in which a portion of the diglycidyl ether (1) is replaced by (3) a polyglycidyl ether of a polyhydric phenol having an epoxy equivalent weight of 140–2000, the weight ratio of (1) to (3) being in the range of about 80:20 to 20:80.

References Cited
UNITED STATES PATENTS

| | | | |
|---|---|---|---|
| 2,326,966 | 8/1953 | O'Leary | 220—81 |
| 3,030,247 | 4/1962 | Schurb | 260—47 |
| 3,075,945 | 1/1963 | Kissel | 260—47 |
| 3,155,661 | 11/1964 | Foreman et al. | 260—249.9 |
| 3,235,620 | 2/1966 | Phillips et al. | 260—834 |

WILLIAM H. SHORT, *Primary Examiner.*

T. PERTILLA, *Assistant Examiner.*